UNITED STATES PATENT OFFICE.

NATHAN FALLEK, OF DENVER, COLORADO, ASSIGNOR TO THE COOK RAILWAY SIGNAL COMPANY, OF DENVER, COLORADO, A CORPORATION OF COLORADO.

RECTIFIER COMPOUND.

1,056,327.     Specification of Letters Patent.     Patented Mar. 18, 1913.

No Drawing.     Application filed June 17, 1912. Serial No. 704,096.

*To all whom it may concern:*

Be it known that I, NATHAN FALLEK, citizen of the United States, residing in the city and county of Denver and State of Colorado, have invented certain new and useful Improvements in Rectifier Compounds; and I do declare the following to be a full, clear, and exact description of the invention, such as will enable others skilled in the art to which it appertains to make and use the same.

My invention relates to a composition of matter for use in electrical rectifiers and consists of sodium phosphate, asbestos, sodium silicate and water, prepared in the following manner: I mix one pound of the sodium phosphate in two gallons of water, (preferably distilled). The asbestos, (preferably white or bleached), should be boiled in distilled water for one hour approximately, for the purpose of removing all impurities. It is then wrung out of the water and dried until all the moisture has been removed. Enough of the asbestos, prepared as aforesaid, is then placed in the said solution of sodium phosphate to completely absorb the latter. The sodium silicate, which is in powder form, is slowly poured into distilled water, which is rapidly stirred in order to thoroughly dissolve the powder. Enough of the sodium silicate is put into the water to raise the specific gravity of the solution, when subjected to the hydrometer test, to 1180. This is based on the assumption that the specific gravity of the distilled water is 1000.

Assuming that 16 parts by weight designates the quantity of the compound to be formed, a quantity of the asbestos and sodium phosphate, equal to 15 of these parts, is taken and one part by weight of the sodium silicate solution is added thereto, completing the compound which is in the form of a thick pulp, making an approximately dry composition which may then be introduced into the rectifier, filling the chamber of the latter between the elements, as aluminum and lead.

Having thus described my invention, what I claim is:

1. A compound for electrical rectifiers consisting of sodium phosphate, asbestos, sodium silicate, and water, in substantially the proportions specified.

2. The herein described composition of matter for use as a rectifier compound consisting of dilute solution of sodium phosphate, a sufficient quantity of asbestos to absorb the sodium phosphate, and one part by weight of a solution of sodium silicate to 15 parts by weight of the sodium phosphate solution and asbestos.

3. The herein described composition of matter for use as a compound for electrical rectifiers consisting of sodium phosphate, water, asbestos, and sodium silicate solution, in the proportion of one pound of sodium phosphate to two gallons of water, enough asbestos to absorb the said solution, and one part by weight of the sodium silicate solution to 15 parts by weight of the sodium phosphate solution and asbestos.

4. A composition of matter for use as a compound for electrical rectifiers consisting of sodium phosphate, asbestos, sodium silicate, and water, in the proportion of one pound of sodium phosphate to two gallons of water, enough asbestos to absorb the said sodium phosphate solution, enough sodium silicate to raise distilled water to the specific gravity of 1180, hydrometer test, one part by weight of this sodium silicate solution being used for 15 parts by weight of the sodium phosphate solution and asbestos, In testimony whereof I affix my signature in presence of two witnesses.

NATHAN FALLEK.

Witnesses:
A. J. O'BRIEN,
MAY CLEMENTS.